(12) United States Patent
Hynds et al.

(10) Patent No.: US 6,464,291 B2
(45) Date of Patent: Oct. 15, 2002

(54) VEHICLE CANOPY TOP WITH AN IMPROVED DRAINAGE SYSTEM

(75) Inventors: Ernest Jefferson Hynds; James Michael Fulford, both of Evans, GA (US)

(73) Assignee: Club Car Inc., Evans, GA (US)

( * ) Notice: Subject to any disclaimer, the term of this patent is extended or adjusted under 35 U.S.C. 154(b) by 0 days.

(21) Appl. No.: 09/782,404

(22) Filed: Feb. 13, 2001

(65) Prior Publication Data

US 2002/0014790 A1 Feb. 7, 2002

Related U.S. Application Data

(63) Continuation-in-part of application No. 09/439,149, filed on Nov. 12, 1999, now Pat. No. 6,186,584.

(51) Int. Cl.[7] .............................................. B62D 25/07
(52) U.S. Cl. ................... 296/213; 280/DIG. 5
(58) Field of Search ................... 296/163, 102, 296/213, 225; 180/89.1; 280/DIG. 5

(56) References Cited

U.S. PATENT DOCUMENTS

| | | | |
|---|---|---|---|
| 4,332,415 A | 6/1982 | Williams | 296/213 |
| 4,650,238 A | 3/1987 | Healey | 280/DIG. 5 |
| 5,031,713 A | 7/1991 | Criscuolo | 280/DIG. 5 |
| 5,094,500 A | 3/1992 | Maypole et al. | 280/DIG. 5 |
| 5,190,340 A | 3/1993 | Nuscher | 280/DIG. 5 |

*Primary Examiner*—D. Glenn Dayoan
*Assistant Examiner*—Jason Morrow
(74) *Attorney, Agent, or Firm*—Michael Best & Friedrich LLP

(57) ABSTRACT

A canopy top for a utility or recreational vehicle having improved drainage. The canopy has a gutter extending along a portion of its top surface and a drain hole extending through the canopy. The drain hole has a given configuration with a receiving edge extending along the gutter's collection surface. The receiving edge has a length equal to or greater than a maximum height, taken substantially perpendicular to the receiving edge, of the hole. The hole also has an exit edge extending along the bottom surface and the receiving and exit ledges are tapered toward one another and joined by an arcuate transition portion.

19 Claims, 9 Drawing Sheets

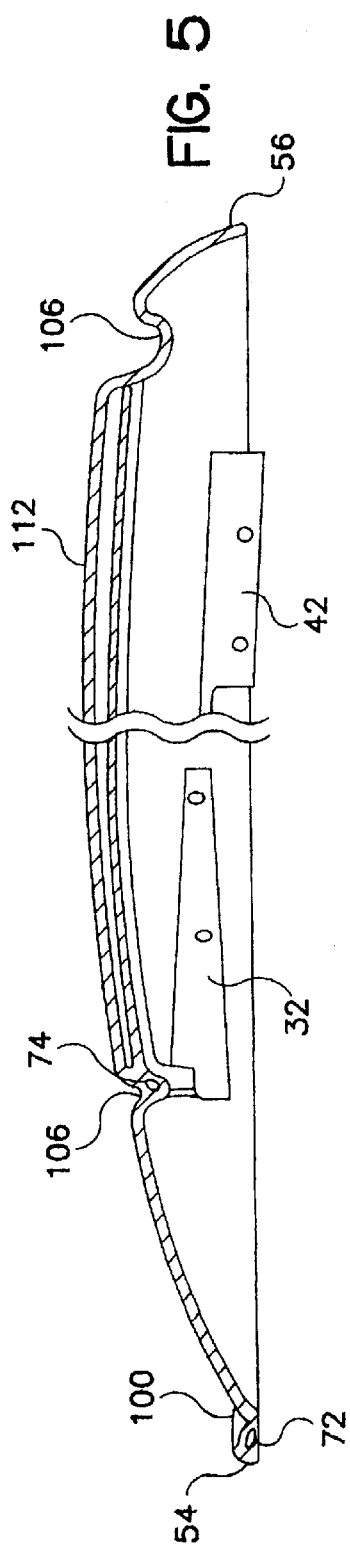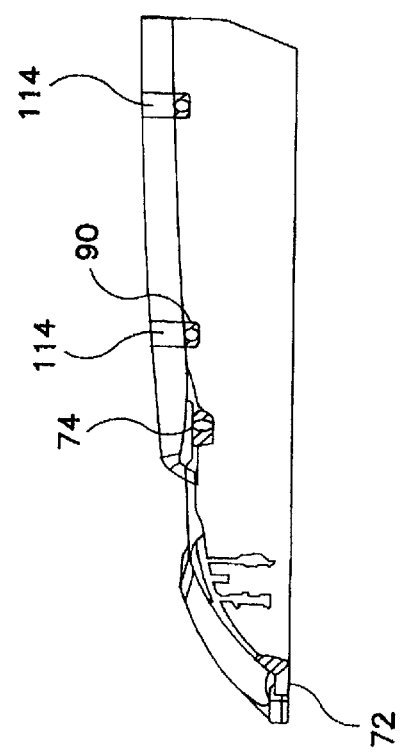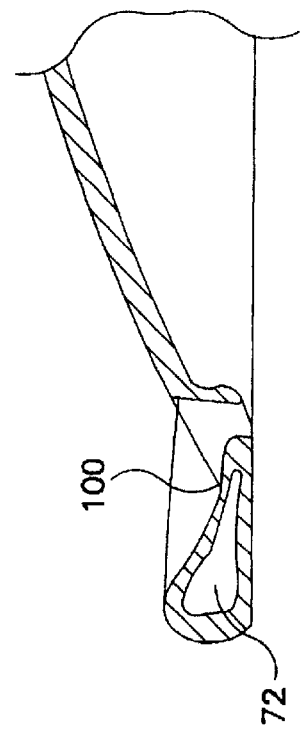

VEHICLE CANOPY TOP WITH AN IMPROVED DRAINAGE SYSTEM

This application is a continuation-in-part of U.S. patent application Ser. No. 09/439,149 filed Nov. 12, 1999, now U.S. Pat. No. 6,186,584, issued Feb. 13, 2001.

BACKGROUND

The present invention relates to recreational and utility vehicles, and more particularly to canopy tops for golf cars and similar utility vehicles.

Golf cars, and similar recreational or utility vehicles, often include a roof in the form of a canopy over at least the passenger sitting area to protect the passengers from sun and rain. Some prior art canopies have been constructed from single or multiple sheets of thermoplastic material, such as polyethylene or polypropylene. Many prior art canopies constructed from a single sheet of thermoplastic material lack rigidity and are subject to vibration and early failure. On the other hand, many prior art canopies constructed from multiple sheets of thermoplastic material are unacceptably heavy or bulky in appearance. In both cases, prior art canopies generally have a sharp edge along the perimeter against which a passenger's head might strike, causing injury. Additionally, many prior art canopies are subject to water dripping from the canopy into the vehicle.

SUMMARY

The present invention relates to a canopy top for a utility or recreational vehicle having improved drainage.

In one aspect of the present invention, the canopy has a gutter extending along a portion of its top surface and a drain hole extending through the canopy. The drain hole has a given configuration with a receiving edge extending along the gutter's collection surface. The receiving edge has a length equal to or greater than a maximum height, taken substantially perpendicular to the receiving edge, of the hole. In a second aspect of the invention, the hole also has an exit edge extending along the bottom surface and a directing ledge protruding from the bottom surface and extending between the exit edge and the perimeter edge of the canopy. In another aspect of the invention, the receiving and exit ledges are tapered toward one another and joined by an arcuate transition portion.

In yet another aspect of the invention, the canopy has a drip bead depending from its bottom surface about a substantial portion of its perimeter edge. The drip bead has opposed inner and outer sides joined by a tip terminating in a minimized surface area. At least the inner side is substantially perpendicular to the bottom surface of the canopy.

BRIEF DESCRIPTION OF THE DRAWINGS

FIG. 5 is a cross-sectional view along line 5—5 in FIG. 4;

FIG. 6 is a cross-sectional view along line 6—6 in FIG. 4;

FIG. 7 is a cross-sectional view along line 7—7 in FIG. 3;

DETAILED DESCRIPTION OF THE PREFERRED EMBODIMENTS

Figure 1:
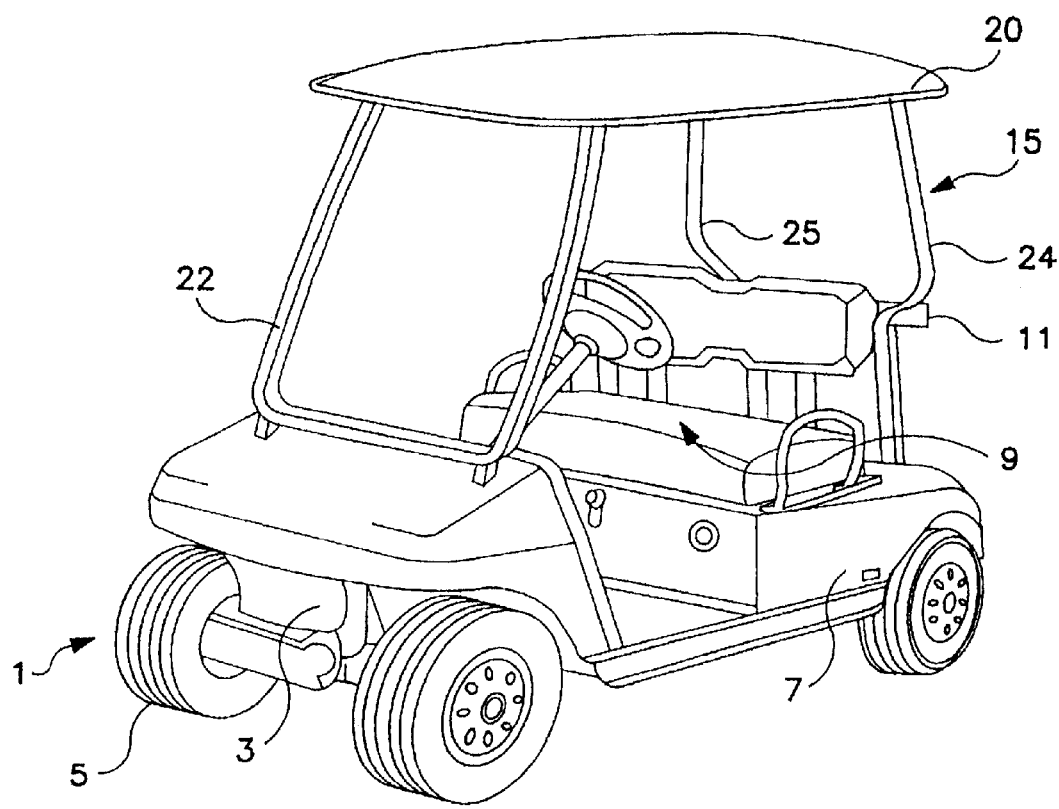
FIG. 1 is a schematic, perspective front view of a golf car incorporating features of the invention.

The preferred embodiments will be described with reference to the drawing figures with like numbers representing like elements throughout.

Referring to FIG. 1, there is shown a schematic, perspective front view of a golf car incorporating features of the present invention. The golf car 1 generally comprises a chassis body 3, wheels 5, a motor 7 for driving wheels 5, a passenger sitting area 9, a golf bag storage area 11, a utility storage area (not shown), and a sunroof canopy assembly 15. The canopy assembly 15 generally comprises a generally rectangular roof canopy 20, a front support frame 22, and a pair of rear support frames 24, 25.

Figure 2:
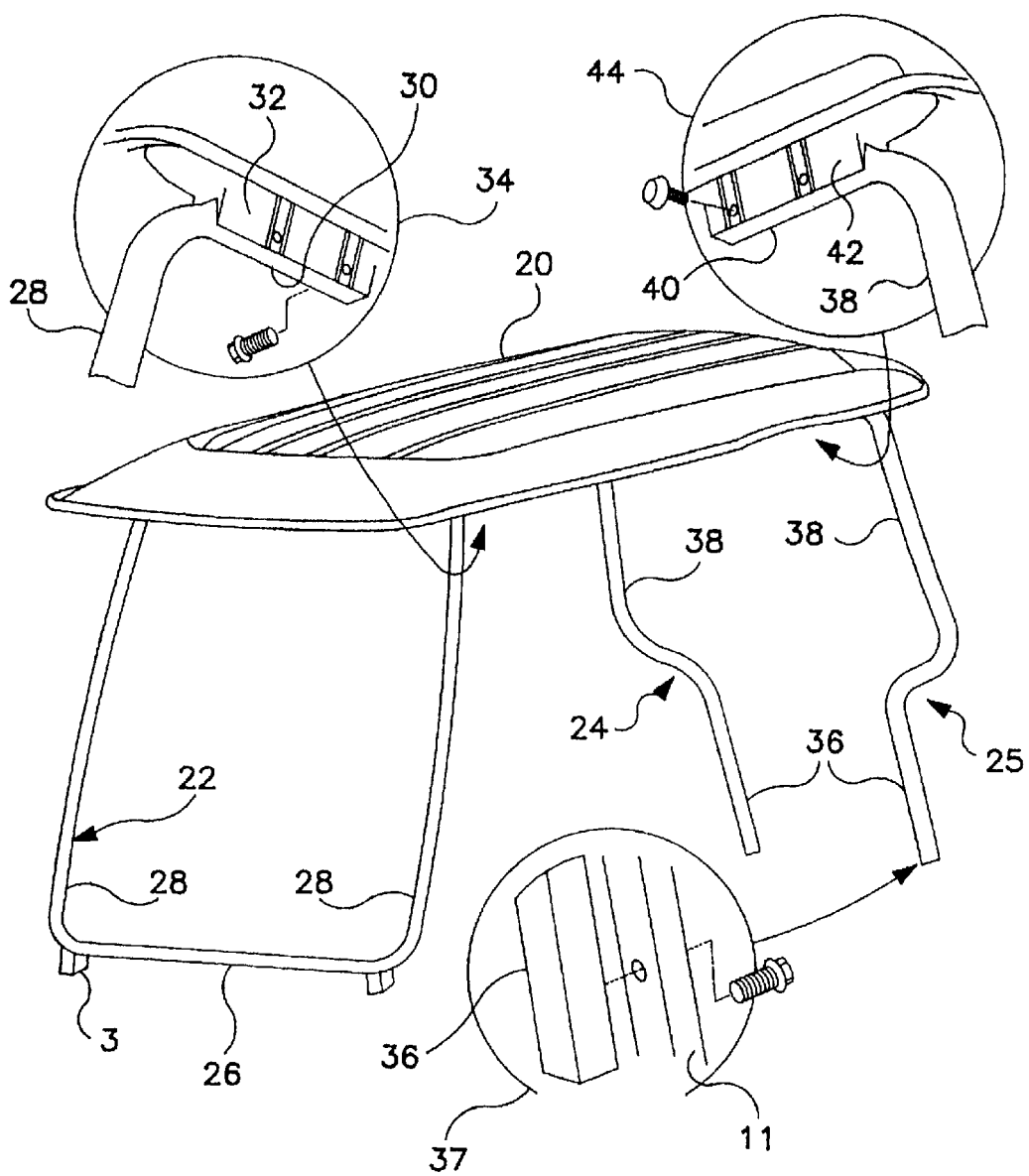
FIG. 2 is a schematic, perspective front view of a sunroof canopy, with mounting frames and braces, and exploded, magnified portions illustrating mounting of the canopy to a golf car.

As shown in FIG. 2, front support frame 22 is comprised of a generally U-shaped tubular member having a bottom section 26 and two upwardly extending legs 28 with each leg terminating in a rearwardly extending portion 30. Each portion 30 extends into a slotted front side member 32 formed integrally on the underside of the canopy 20 adjacent the respective side edge. As illustrated in circled portion 34 of FIG. 2, portion 30 is bolted to slotted member 32. The bottom section 26 of the front support frame is fastened to the chassis 3.

Rear support frames 24, 25 each include a bottom portion 36 fastened to chassis 3 at bag storage area 11 (as illustrated in circled portion 37 of FIG. 2) and an upwardly extending portion 38 which terminates in a forwardly extending portion 40. Each portion 40 extends into a slotted rear side member 42 formed integrally on the underside of the canopy 20 adjacent to the respective side edge. As illustrated in circled portion 44 of FIG. 2, portion 40 is bolted to slotted member 42.

Figure 3:
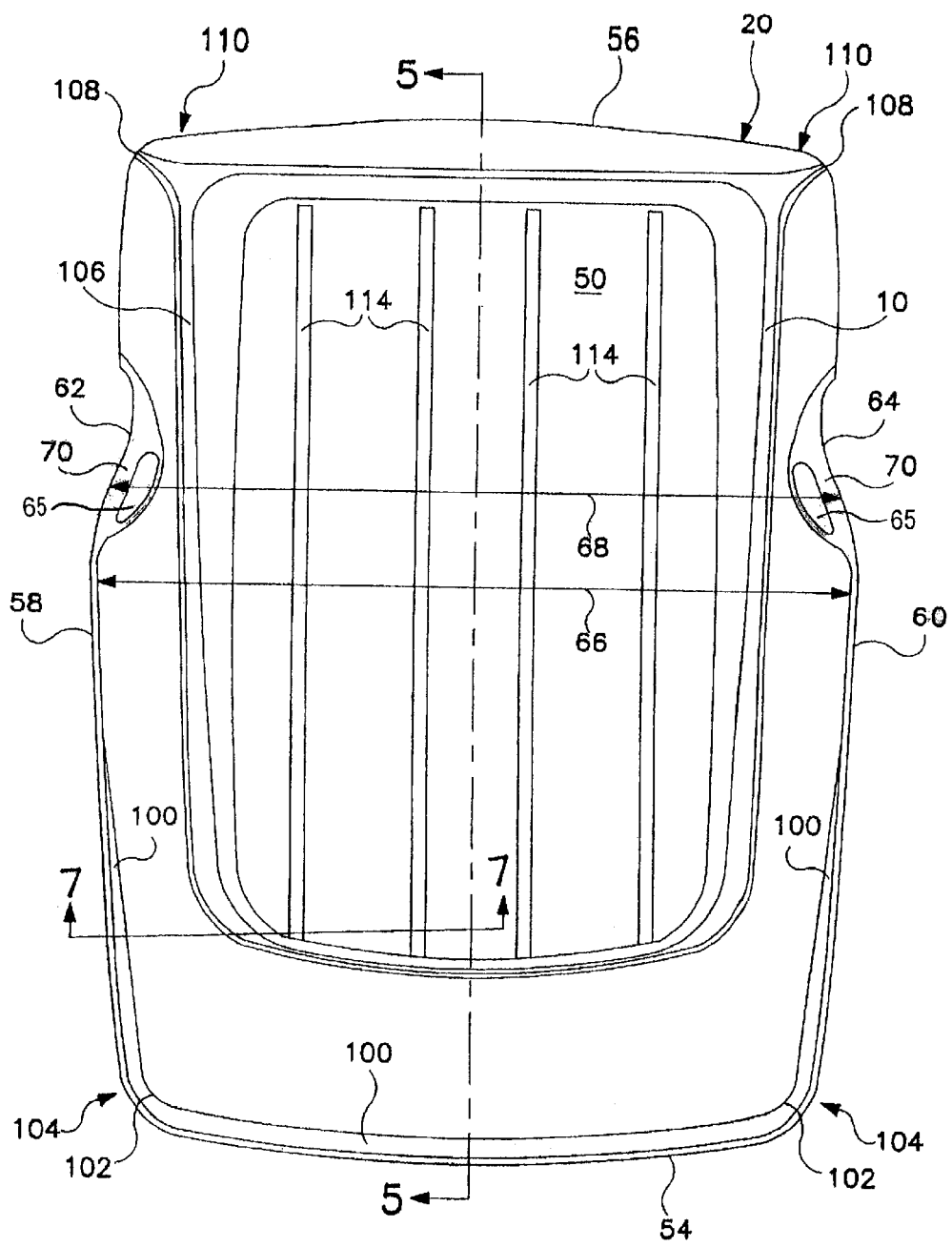
FIG. 3 is a schematic, top plan view of the canopy of FIG. 1.
Figure 13:
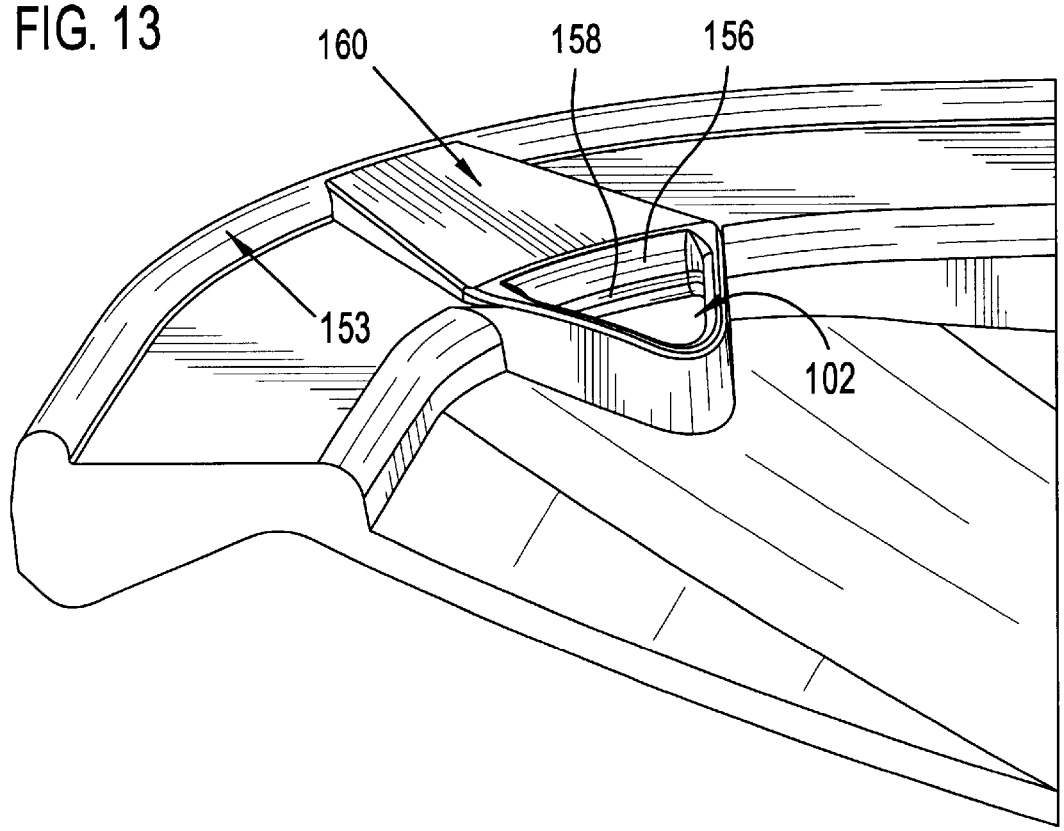
FIG. 13 is a bottom perspective view of a front, side portion of the canopy of FIG. 1.
Figure 14:
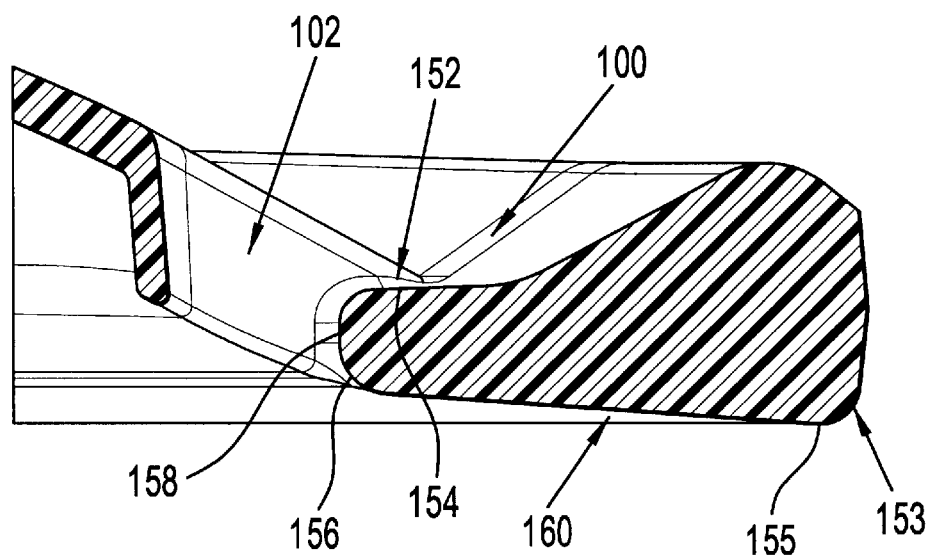
FIG. 14 is a cross-sectional view along line 14—14 in FIG. 12.

Referring to FIG. 3, canopy 20 is formed into a single sheet of thermoplastic material, preferably polypropylene, using gas assisted molding procedures. Canopy 20 has a top surface 50, a bottom surface 52 and edges that form a canopy perimeter, including a front canopy perimeter portion 54, a rear canopy perimeter portion 56, and substantially parallel first and second side canopy perimeter portions 58, 60 extending between the front and rear perimeter portions 54, 56. As can be seen in FIGS. 5–10, the edges defining the perimeter are rounded, thereby reducing the potential for injury, if for example, a passenger were to strike their head against such. The edges preferably further include a drip edge bead 153 depending therefrom, see FIGS. 13–15, the function of which will be described hereinafter.

A first handgrip 62 is formed integrally on first canopy side perimeter portion 58. A second handgrip 64 is formed integrally on second canopy side perimeter portion 60. Handgrips 62, 64 are located at a rearward position of canopy 20 approximately an equal distance from rear canopy perimeter portion 56. Each handgrip 62, 64 is defined by an aperture 65 through the canopy 20 which further defines a gripping member 70. The gripping members 70 preferably extend inward moving from front to back. As such, the transverse width 66 of the front portion of canopy 20 is wider than the transverse width 68 of the portion of canopy 20 extending between the gripping members 70 and each gripping member is completely within the extent of the front canopy portion width 66. This allows the front canopy portion to shield hands holding the gripping members 70 of handgrips 62, 64 as car 1 moves forward.

Figure 4:
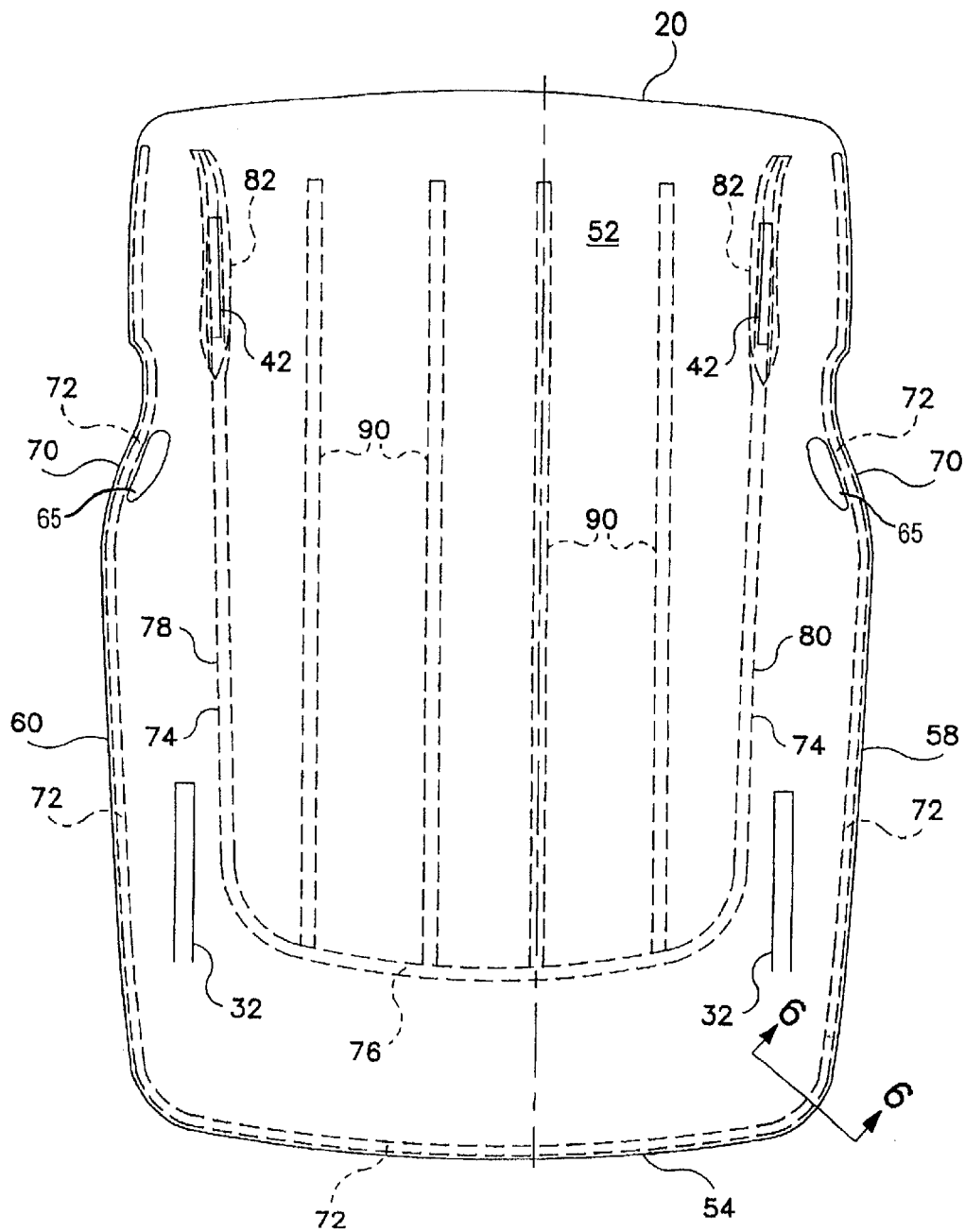
FIG. 4 is a schematic, bottom plan view of the canopy of FIG. 1 with the stiffener channels shown in dotted lines.
Figure 8:
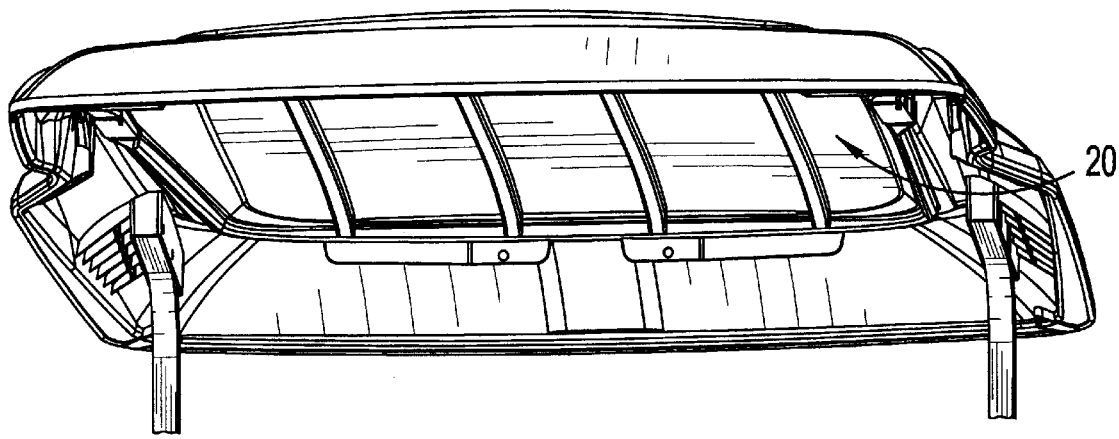
FIG. 8 is a perspective rear view of the underside of the canopy of FIG. 1.
Figure 9:
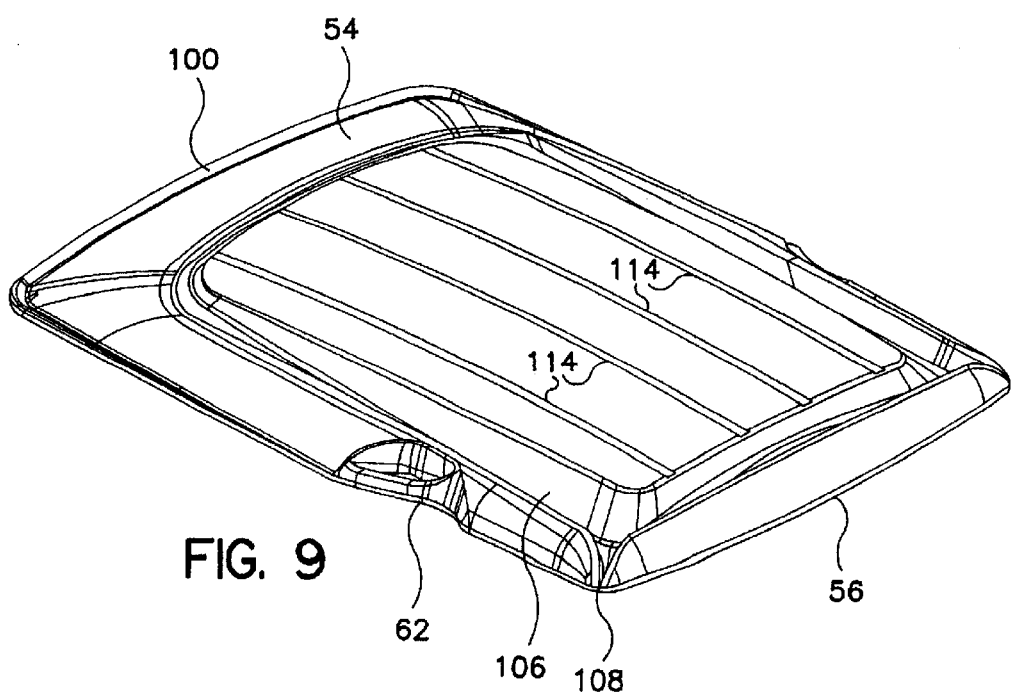
FIG. 9 is a rear perspective view of the canopy of FIG. 1.
Figure 10:
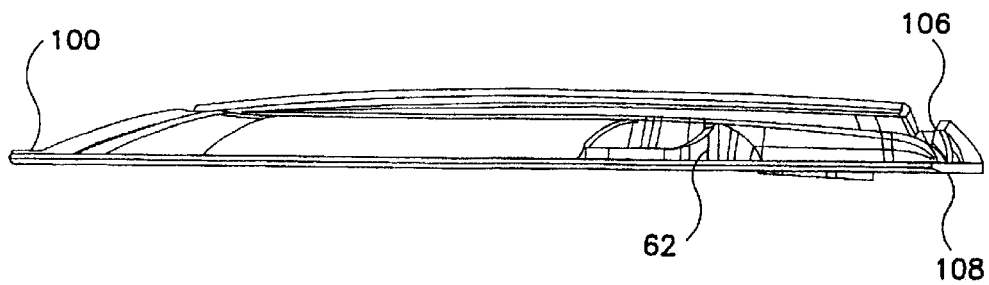
FIG. 10 is a side elevational view of the canopy of FIG. 1.

Referring to FIGS. 4 and 5, the canopy 20 includes a plurality of hollow channel stiffeners 72, 74, 90. First hollow stiffener channel 72, formed integrally in the sheet of canopy 20 at the sheet edges, extends along the front canopy perimeter 54, along side canopy perimeters 58, 60, through gripping member 70 and terminates adjacent rear canopy perimeter portion 56. Channel 72 forms a gently curved perimeter offering protection against injury to passengers. Channel 72 is hollow as a result of the gas assisted injection mold process, and provides stiffness to the sheet of the canopy 20. Hollow channel 72 is further shown in FIGS. 6–9.

Likewise providing stiffness is second, hollow channel 74 formed integrally into the sheet of canopy 20 in-board of first stiffener channel 72. Second stiffener channel 74 has a front channel portion 76 and first and second side channel portions 78, 80 extending parallel to front and side canopy perimeter portions 54, 58 and 60, respectively. Channel portions 78, 80 each terminate in a bifurcated, rearward hollow channel section that encloses a respective slotted rear member 42 that is formed integrally into canopy 20. Integral slotted front members 32 are also shown. Thus, it can be seen that second stiffener 74 forms a generally U-shaped stiffener that parallels front canopy perimeter 54 and curves rearwardly to extend parallel to side canopy perimeter portions 58, 60, respectively. Hollow channel 74 is further shown in FIGS. 6–9.

Providing added stiffness is a plurality of third, hollow stiffeners 90 formed integrally into the sheet of canopy 20, in-board of second, hollow stiffeners 74. Stiffeners 90 are separate, longitudinal hollow channels extending parallel to side canopy perimeter portions 58, 60. We prefer four stiffeners 90, but fewer or more will work. Stiffeners 90 intersect front channel portion 76 and terminate adjacent rear canopy perimeter portion 56. Hollow channels 90 are further shown in FIGS. 6, 8 and 9.

We prefer to provide canopy surface 112 with a plurality of secondary depressions 114 directly above hollow channels 90 to cosmetically mask any distortions or wrinkling associated with channels 90, although a smooth or pebbled surface will work.

We have successfully provided a canopy in accordance with this invention with a wall thickness in the range of 0.100 to 0.125 inches, from the following thermoplastic material: 20% calcium carbonate filled, high impact polypropylene copolymer.

Figure 11:
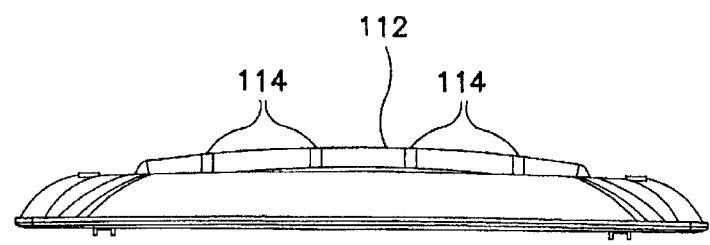
FIG. 11 is a front elevational view of the canopy of FIG. 1.
Figure 12:
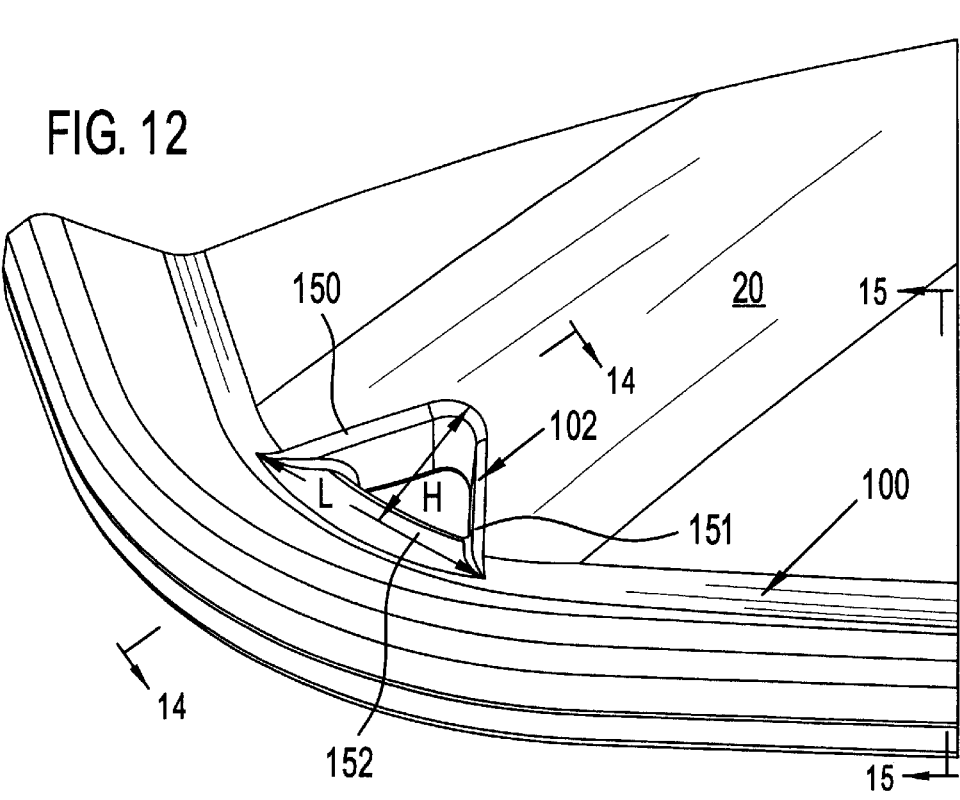
FIG. 12 is a top perspective view of a front, side portion of the canopy of FIG. 1.

Referring to FIG. 3, the location and orientation of the preferred drain gutters 100, 106 on canopy 20 will be described. First drain gutter depression 100 is formed into the sheet of canopy 20 and extends adjacent to front canopy perimeter 54 and curves rearwardly to extend along canopy perimeters 58, 60, forming a U-shaped gutter terminating at handgrips 62, 64. A drain hole 102 is located at each front corner 104 of gutter 100. The second drain gutter depression 106 is formed into the sheet of canopy 20 and extends substantially parallel to the entire perimeter of canopy 20, forming a generally rectangular shaped gutter. The side walls of gutter 106 part to form a drain aperture 108 at each rear corner 110. As shown in FIGS. 5 and 9–11, first drain gutter 100 slopes gently forwardly, rear to front, to direct water to drain holes 102. Second drain gutter 106 slopes gently rearwardly, front to rear, to direct water to rear corner apertures 108. As shown in FIG. 11, central canopy surface 112 slopes gently transversely, side to side, to direct water to gutter 106.

Water flow from drain holes in general can be characterized as "wicking-dominated" or "stream-dominated" flow. With wicking-dominated flow, water flowing through the drain hole briefly adheres ("wicks") to the canopy surface adjacent the drain hole. The adhesion of the water particles causes the water flow to be diverted along the underside of the canopy prior to the water particles shearing off and falling downwardly under the influence of gravity. Wicking-dominated flow is preferred, provided it is controlled, i.e., the flow is diverted away from the vehicle chassis. In many prior art devices, the wick flow is random at best, and in many instances, the flow is actually diverted toward the vehicle chassis.

With stream-dominated flow, water flow through the holes is more substantial, in the manner of fluid exiting a pipe, and the water particles do not adhere to the canopy, but instead fall downwardly immediately upon exiting the hole. Such flow may arise during heavy rains when the gutter significantly fills with water. This type of flow is generally not desired since it is difficult to control and the water often falls directly into the vehicle. Another problem with heavy rain is that, even with stream flow, the drain holes are incapable of draining the water from the gutter fast enough. When the gutter overflows, the water tends to wick around the edge of the canopy to the underside from where it typically falls into the vehicle.

Figure 15:
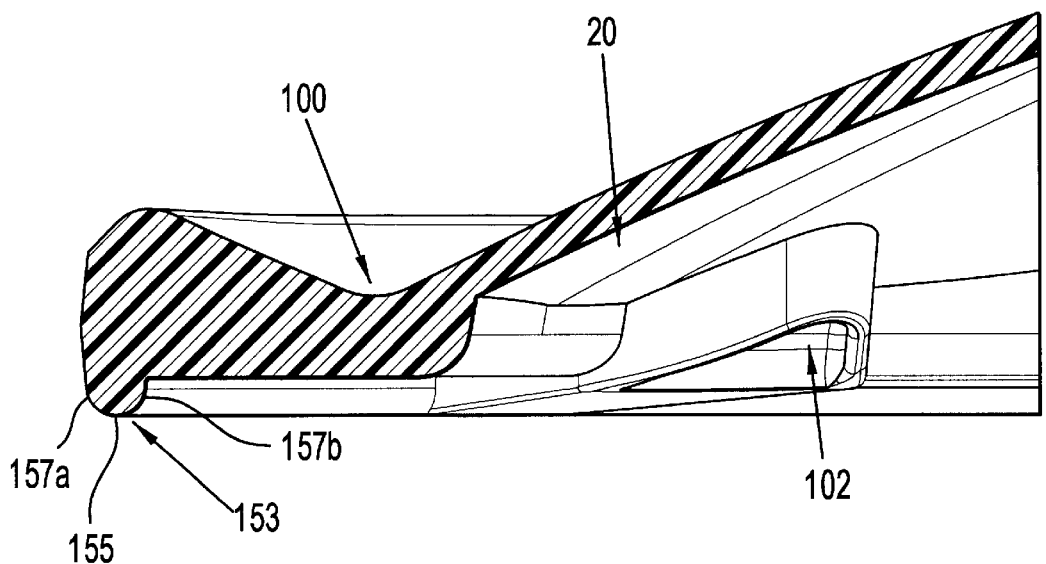
FIG. 15 is a cross-sectional view along line 15—15 in FIG. 12.

Referring to FIGS. 12–16, the preferred drain holes 102 of the present invention are shown. Each drain hole 102 is generally triangular-shaped with a receiving edge 152 extending between intersecting legs 150, 151. The receiving edge 152 is preferably positioned adjacent the gutter's lowest elevation, i.e., the elevation to which the water naturally flows. The hole 102 is of a large cross-section relative to the generally round holes of the prior art. The relatively large cross-sectional area allows for a greater flow rate of water through the hole 102, thereby reducing the likelihood water will pool in the gutter 100 and overflow therefrom. In the event any water does overflow from the gutter 100 or any other portion of the canopy 20, the drip edge bead 153 prevents the water from wicking around the edge to the underside of the canopy 20. As shown in FIG. 15, the drip edge bead 153 provides a rounded edge with opposed sides 157a,b substantially parallel to the underside of the canopy 20 and a tip of minimized surface area 155 extending therebetween. In order to wick to the underside of the canopy 20, the water would have to maintain adherence over the minimized surface area 155 and then travel up the inside wall 157b, against gravity, toward the canopy underside. As such, the water has a much greater tendency to sheer at the minimized surface area portion 155 and fall to earth under the influence of gravity, thereby reducing the occurrence of wicking to the underside of the canopy 20. The drip edge bead 153 is preferably provided about the entire canopy perimeter such that water flow down any edge portion will be deterred from wicking onto the underside of the canopy 20.

The receiving edge 152 of the drain hole 102 has a relatively long receiving ledge 154 formed in the upper surface 50 of the canopy 20 and a relatively long exit ledge 156 formed in the lower surface 52. By relatively long, it is meant a maximum length L equal to or greater than the height H of the hole. The receiving ledge 154 directs water into the hole 102 while the exit ledge 156 directs the water exiting the hole 102 outward, toward the perimeter of the canopy 20. The receiving and exit ledges 154, 156 are joined by a smooth, arcuate transition 158. The relatively large size of the ledges 154, 156 tend to spread the water out, thereby allowing greater adhesive contact of the water to the surfaces. The smooth transition 158 allows the adhered water to flow between the ledges 154, 156, and thereby change direction (inward to outward), without interrupting the adhesion.

Figure 16:
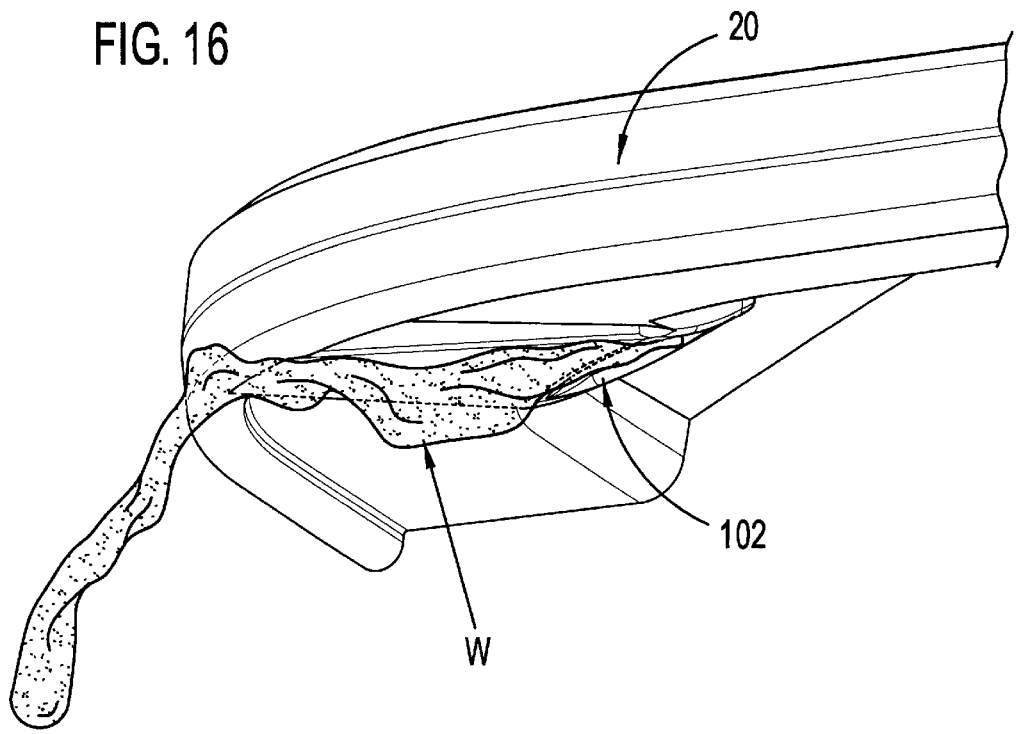
FIG. 16 is a side perspective view of a front, side portion of the canopy of FIG. 1 illustrating water flow from a preferred drain hole of the present invention.

The adhered water exiting the hole 102 is directed to a directing ledge 160 protruding from the underside of the canopy 20 and extending between the exit ledge 156 and the edge of the canopy 20. The directing ledge 160 generally maintains the water within its side boundaries, as opposed to a simple flat canopy surface which may allow random spreading of the water. The directing ledge 160 has a slight downward slope as it runs from the drain hole 102 to the edge of the canopy 20 where it intersects the drip edge bead 153. In the preferred embodiment, the directing ledge 160 is flush with the drip edge bead tip 155. The downward slope allows gravity to aid in speeding up the water W flow along the directing ledge 160 such that the water droplets are effectively propelled from the edge of the canopy 20 before falling to earth, as illustrated in FIG. 16. The drip edge bead 153 again helps to ensure sheering of the water as it reaches the edge of the canopy 20.

While the preferred drain holes 102 and the drip edge bead 153 have been described in conjunction with the preferred canopy 20 and gutter system of the present invention, it is understood that they may also be used in conjunction with other canopies and gutter systems.

What is claimed is:

1. A canopy top for a vehicle, the top comprising:
  a canopy structure having top and bottom surfaces;
  a gutter extending along a portion of the top surface and defining a water collection surface; and
  a drain hole extending through the canopy from the top surface to the bottom surface, the drain hole having a receiving ledge extending along the gutter collection surface, the receiving ledge having a length greater than a maximum width across the hole taken substantially perpendicular to the receiving ledge.

2. The canopy top of claim 1 wherein the drain hole has a triangular configuration and the receiving ledge extends along the triangle base.

3. The canopy top of claim 1 wherein the drain hole has an exit ledge extending along the canopy bottom surface and a directing ledge extends from the exit ledge to a perimeter edge of the canopy.

4. The canopy of claim 3 wherein the directing ledge has a generally rectangular configuration with opposed sides set off from the canopy bottom surface.

5. The canopy of claim 3 wherein the exit ledge is at a given elevation and the perimeter edge is at a lower elevation such that the directing ledge slopes downward from the exit ledge to the perimeter edge.

6. The canopy top of claim 1 wherein the drain hole has an exit ledge extending along the canopy bottom surface and the receiving and exit ledges are tapered toward one another and joined by an arcuate transition portion.

7. A canopy top for a vehicle, the top comprising:
  a canopy structure having top and bottom surfaces and a perimeter edge;
  a gutter extending along a portion of the top surface and defining a water collection surface;
  a drain hole extending through the canopy from the top surface to the bottom surface, the drain hole having a receiving ledge extending along the gutter collection surface and an exit ledge extending along the bottom surface; and
  a directing ledge extending from the exit ledge to the perimeter edge.

8. The canopy of claim 7 wherein the directing ledge has a generally rectangular configuration with opposed sides set off from the canopy bottom surface.

9. The canopy of claim 7 wherein the exit ledge is at a given elevation and the perimeter edge is at a lower elevation such that the directing ledge slopes downward from the exit ledge to the perimeter edge.

10. The canopy of claim 7 wherein the receiving ledge has a length greater than a maximum width across the hole taken substantially perpendicular to the receiving ledge.

11. The canopy of claim 7 wherein the drain hole has a triangular configuration and the receiving edge extends along the triangle base.

12. The canopy top of claim 7 wherein the receiving and exit ledges are tapered toward one another and joined by an arcuate transition portion.

13. The canopy top of claim 7 further comprising a drip bead depending from the bottom surface and extending along a substantial portion of the perimeter edge, the drip bead having opposed inner and outer sides joined by a tip terminating in a minimized surface area, at least the inner side being substantially perpendicular to the bottom surface.

14. The canopy top of claim 13 wherein the directing ledge is flush with the drip bead adjacent the perimeter edge.

15. A canopy top for a vehicle, the top comprising:
  a canopy structure having top and bottom surfaces and a perimeter edge;
  a drip bead depending from the bottom surface and extending along a substantial portion of the perimeter edge, the drip bead having opposed inner and outer sides joined by a tip terminating in a minimized surface area, at least the inner side being substantially perpendicular to the bottom surface; and
  a drain hole extending through the canopy and having an exit ledge extending along the canopy bottom surface, and a directing ledge extending from the exit ledge to the drip bead.

16. The canopy top of claim 15 wherein the directing ledge is flush with the drip bead minimized surface area adjacent the perimeter edge.

17. The canopy of claim 16 wherein the exit ledge is at a given elevation and the drip bead minimized surface area is at a lower elevation such that the directing ledge slopes downward from the exit ledge to the drip bead.

18. A canopy top for a vehicle, the top comprising:
a canopy structure having top and bottom surfaces;
a gutter extending along a portion of the top surface and defining a collection surface; and
a drain hole extending through the canopy from the top surface to the bottom surface, the drain hole having a given configuration with a receiving ledge extending along the gutter collection surface and an exit ledge extending along the bottom surface, the receiving and exit ledges being tapered toward one another and joined by an arcuate transition portion.

19. The canopy of claim 18 wherein the receiving ledge has a length greater than a maximum width across the hole taken substantially perpendicular to the receiving ledge.

* * * * *